US012540756B2

(12) United States Patent
Tremolieres et al.

(10) Patent No.: US 12,540,756 B2
(45) Date of Patent: Feb. 3, 2026

(54) METHOD AND INSTALLATIONS FOR PROVIDING ENERGY, PARTICULARLY THERMAL ENERGY, IN AT LEAST ONE BUILDING OR THE LIKE, AND RELATED SYSTEM

(71) Applicant: ACCENTA, Boulogne-Billancourt (FR)

(72) Inventors: Pierre Tremolieres, Orsay (FR); Philippe Bruand, Le Vesinet (FR)

(73) Assignee: ACCENTA, Boulogne-Billancourt (FR)

( * ) Notice: Subject to any disclaimer, the term of this patent is extended or adjusted under 35 U.S.C. 154(b) by 380 days.

(21) Appl. No.: 18/040,091

(22) PCT Filed: Aug. 5, 2021

(86) PCT No.: PCT/EP2021/071882
§ 371 (c)(1),
(2) Date: Jan. 31, 2023

(87) PCT Pub. No.: WO2022/029235
PCT Pub. Date: Feb. 10, 2022

(65) Prior Publication Data
US 2023/0304702 A1    Sep. 28, 2023

(30) Foreign Application Priority Data
Aug. 5, 2020   (FR) ..................... 2008303

(51) Int. Cl.
*F24H 15/152* (2022.01)
*F24D 11/00* (2022.01)
(Continued)

(52) U.S. Cl.
CPC .......... *F24H 15/152* (2022.01); *F24D 11/00* (2013.01); *F24H 15/262* (2022.01);
(Continued)

(58) Field of Classification Search
CPC .. F24D 11/00; F24D 11/0221; F24D 17/0015; F24D 17/0036; F24D 17/02;
(Continued)

(56) References Cited

U.S. PATENT DOCUMENTS

2004/0267408 A1   12/2004   Kramer
2008/0092875 A1    4/2008   Leifer et al.
(Continued)

FOREIGN PATENT DOCUMENTS

CH        710 262 A2 *  4/2016   ............. G05D 23/19
CN       101634502 A    1/2010
(Continued)

OTHER PUBLICATIONS

International Search Report and Written Opinion received for PCT/EP2021/071882, Nov. 8, 2021.
(Continued)

*Primary Examiner* — Kidest Worku
(74) *Attorney, Agent, or Firm* — Greer, Burns & Crain, Ltd

(57) ABSTRACT

A system for regulating a building energy supply and distribution installation, the installation including items of energy collection equipment, each of which is in an energy transfer relationship with a respective source; items of energy transformation equipment powered by the collection equipment; items of energy using equipment; the regulation system configured for defining, for the items of equipment, different respective activation states chosen according to parameters, for optimizing with regard to criteria. The system implements a method in the installation, with the following steps: regulation is performed by placing the items of equipment in respective activation states chosen according to demand and parameters, for the purpose of optimizing with regard to criteria; at an intervention instant of regulation, regulation takes forecasts relating to at least one of the parameters into account, the forecasts relating to a period after the intervention instant. A related installation includes the regulation system.

21 Claims, 3 Drawing Sheets

(51) Int. Cl.
  *F24H 15/262* (2022.01)
  *F24H 15/265* (2022.01)
  *F24H 15/269* (2022.01)
  *F24H 15/296* (2022.01)
(52) U.S. Cl.
  CPC .......... *F24H 15/265* (2022.01); *F24H 15/269* (2022.01); *F24H 15/296* (2022.01); *F24D 2200/11* (2013.01)
(58) Field of Classification Search
  CPC ............ F24D 19/1045; F24D 19/1078; F24D 2200/02; F24D 2200/11; F24D 2200/12; F24D 2200/14; F24D 2200/32; F24D 3/08; F24H 15/152; F24H 15/262; F24H 15/265; F24H 15/269; F24H 15/296; Y02B 10/20; Y02B 10/40; Y02B 10/70; Y02E 10/10
  See application file for complete search history.

(56) References Cited

U.S. PATENT DOCUMENTS

| | | | |
|---|---|---|---|
| 2010/0307734 A1 | 12/2010 | Wildig et al. | |
| 2011/0125451 A1* | 5/2011 | Cheifetz | F24T 10/00 702/130 |
| 2012/0299559 A1* | 11/2012 | McCowen | H02N 11/002 322/2 A |
| 2013/0037236 A1 | 2/2013 | Saunier et al. | |
| 2015/0204618 A1* | 7/2015 | Owens | F28D 20/02 165/10 |
| 2016/0201948 A1 | 7/2016 | Kelly | |
| 2017/0211829 A1 | 7/2017 | Slack et al. | |
| 2018/0283799 A1 | 10/2018 | Sakai et al. | |
| 2020/0159977 A1* | 5/2020 | Hoff | F24F 11/64 |

FOREIGN PATENT DOCUMENTS

| | | | |
|---|---|---|---|
| CN | 109579177 A | 4/2019 | |
| CN | 109740827 A | 5/2019 | |
| DE | 10022544 A1 | 12/2000 | |
| DE | 102010033909 A1 | 2/2012 | |
| DE | 102016015503 A1 * | 6/2018 | ............. F24D 19/10 |
| EP | 2141419 A1 | 1/2010 | |
| EP | 1987298 A1 | 11/2012 | |
| EP | 3012539 A1 | 4/2016 | |
| FR | 2960099 A1 | 11/2011 | |
| FR | 3065516 A1 | 10/2018 | |
| KR | 20130017182 A | 2/2013 | |
| KR | 101801775 B1 | 11/2017 | |
| WO | 2015014951 A2 | 2/2015 | |

OTHER PUBLICATIONS

French Search Report received for Application No. 2008303, dated Mar. 23, 2021.

* cited by examiner

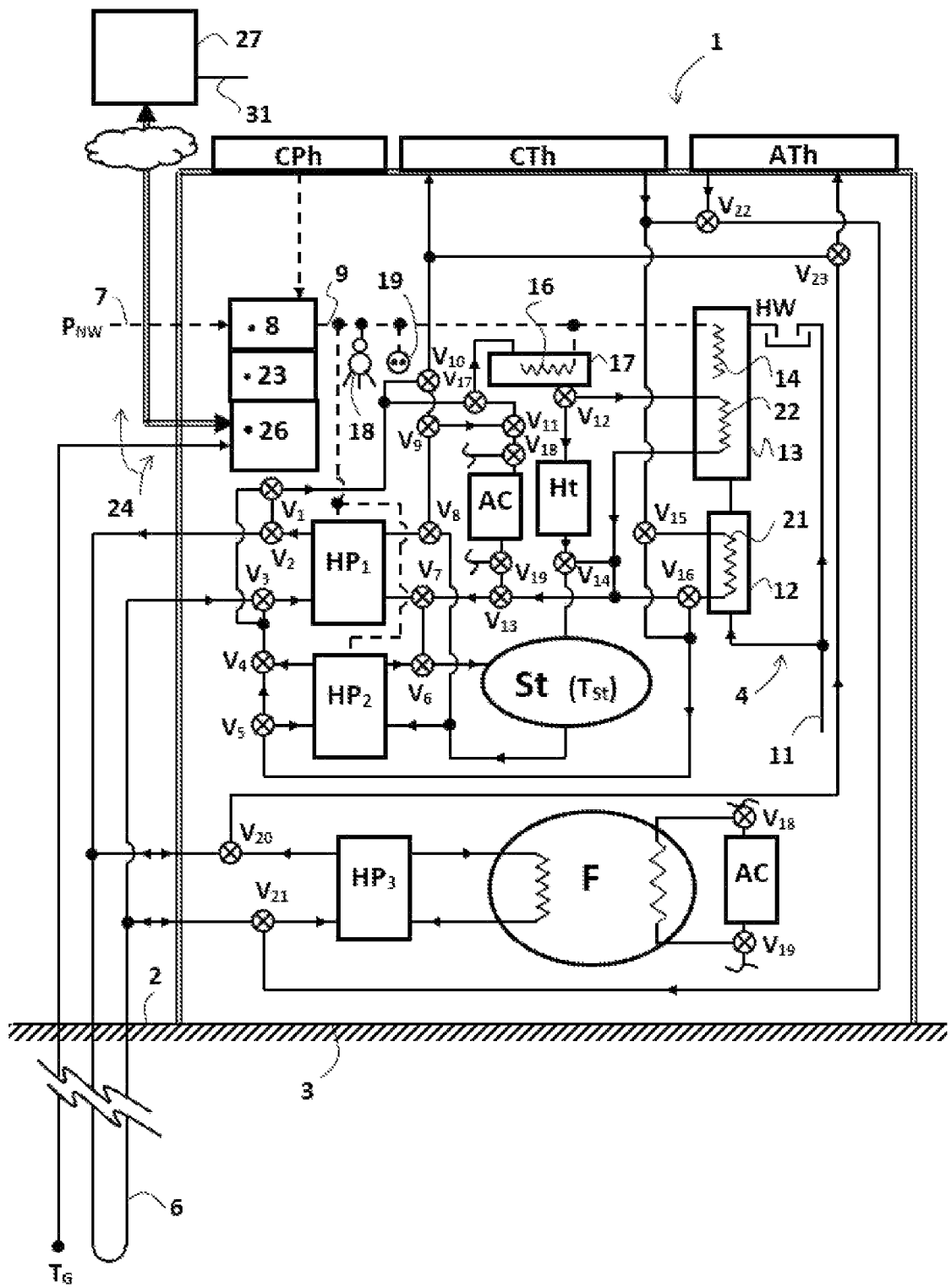
[ FIG 1 ]

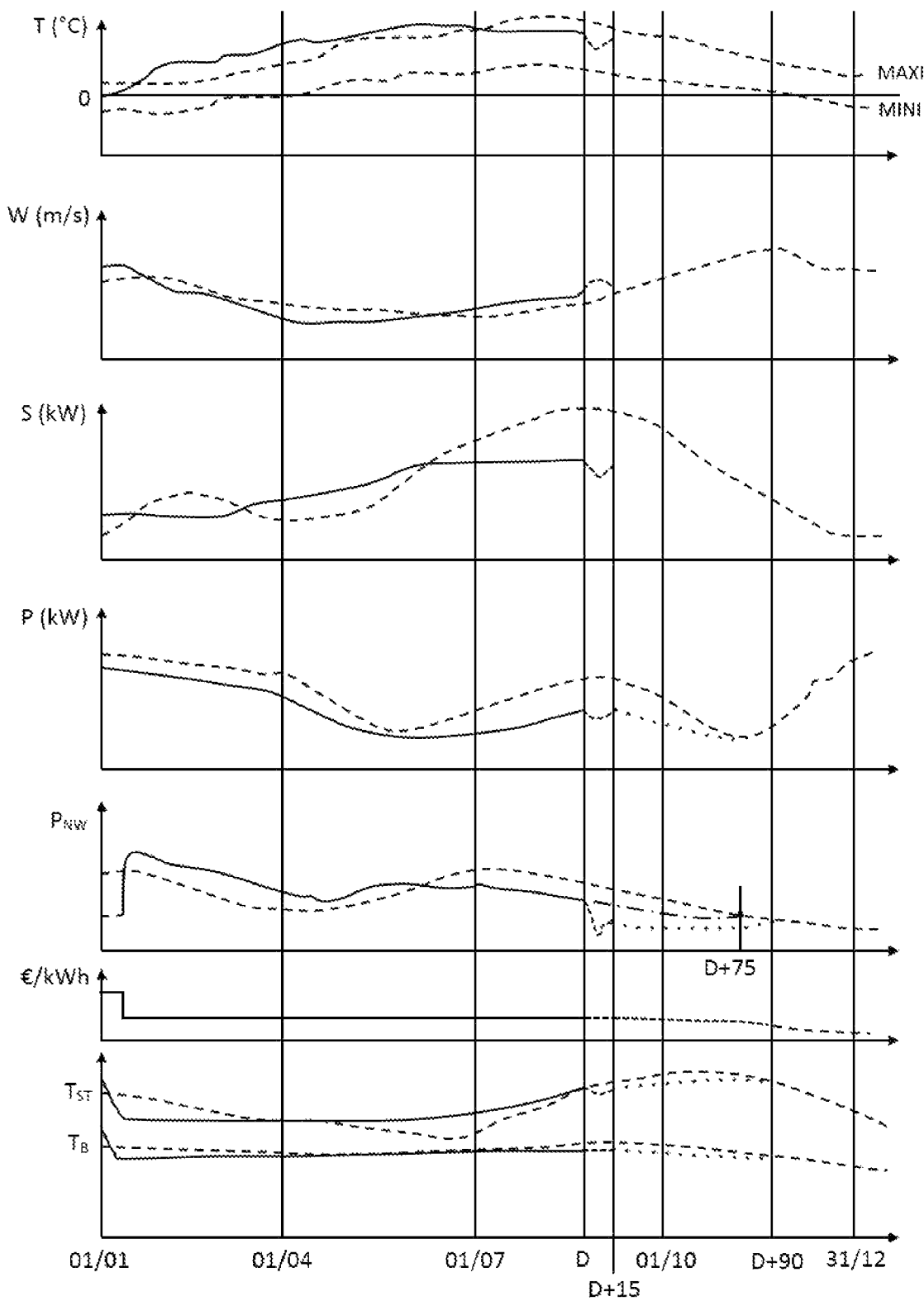
[ FIG 2 ]

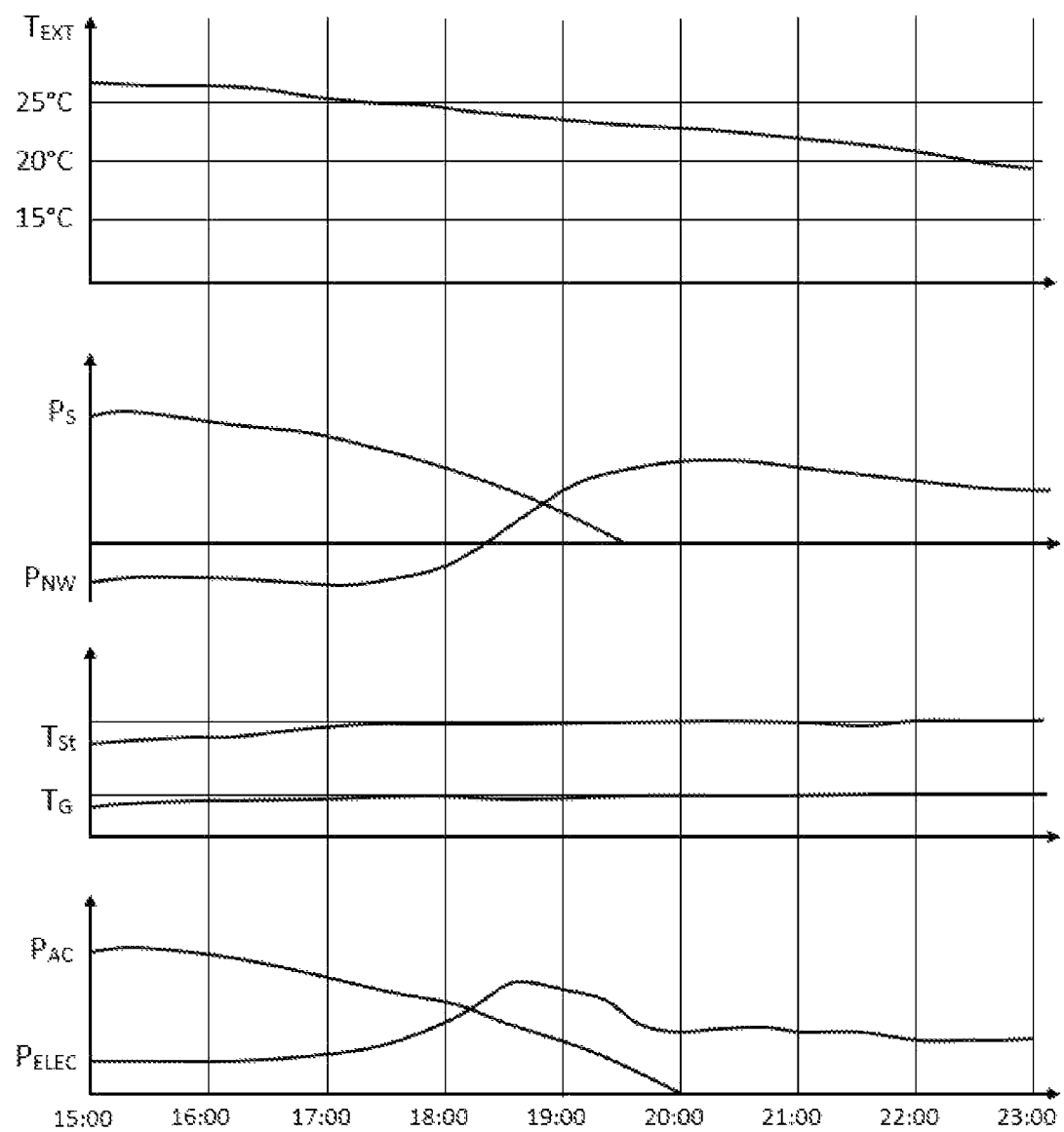
[ FIG 3 ]

METHOD AND INSTALLATIONS FOR PROVIDING ENERGY, PARTICULARLY THERMAL ENERGY, IN AT LEAST ONE BUILDING OR THE LIKE, AND RELATED SYSTEM

BACKGROUND

The present invention relates to a method for supplying energy, in particular thermal energy, in at least one building or the like, with a view to optimization with respect to a certain number of criteria that can include installation cost, operational costs, reduction in energy consumption, environmental considerations, etc.

The present invention also relates to an installation allowing the implementation of the method, as well as an installation configured advantageously for this purpose.

The present invention also comprises a regulation system for the implementation of the method.

The invention relates quite particularly but non-limitatively to relatively large housing developments, for example apartment buildings, groups of buildings, industrial complexes, hospital centres, commercial centres, hotels or hotel-type complexes, school or university campuses, etc.

Installations are known in the building sector making it possible to provision energy from several sources, for example gas or electricity public distribution networks, geothermal probes, solar heat collectors, photovoltaic solar panel collectors, aerothermal solar collectors, or others. These known installations comprise various items of equipment for transforming the collected energy and for using it, for example, heat pumps, Joule-effect heating devices, air-conditioners, boilers, etc. It is also known to implement a method that regulates the installation by weighting the application of the different sources and the different items of equipment as a function of the needs and according to economic or other criteria.

The documents FR 2960099 A1, US 2008/092875 A1, WO 2015/014951 A2, EP 3012539 A1, EP 2141419 A1, FR 3065516 A1, EP 1987298 B1, DE 102010033909 A1, DE 10022544 A1, US 2018/0283799 A1, KR 20130017182 A and KR 101801775 B1 describe installations of this type, developed in various ways in the sense of optimized exploitation of the resources that are the most advantageous in terms of cost and/or environment.

In practice, such installations encounter difficulties that can be chronic or occasional. Among the chronic difficulties, there may be mentioned in particular the temperature drift of the geothermal environment in which the probes are implanted. For example, in a temperate or cold region, the geothermal environment suffering excessive demand cools increasingly over the years, to the point that it becomes unusable, as the natural regeneration of the ground is insufficient to renew the calories removed. Conversely, in a hot region, the geothermal environment, unable to discharge the calories introduced by the air-conditioning system becomes progressively too hot to be useable. In both cases, costly geothermal installations fall into a state of neglect after a few years, or otherwise it is necessary to over-dimension them to the point of making them no longer viable for economic reasons. Even if such extremes are avoided, the installation equipped with a geothermal system that has suffered a temperature drift becomes less efficient overall, since the geothermal system, expected to be one of the most advantageous sources, is no longer as advantageous as was anticipated in the design. Another example of chronic difficulty can be a lasting change in the cost of use of one source or another, or even one item of equipment or another installed in the building. An example of an occasional difficulty can be an unwelcome climatic event or price change, the two often going hand in hand, if for example a period of extreme cold is accompanied by a significantly increased price of the electricity supplied by the public network.

The aim of the present invention is thus to overcome these drawbacks at least partially, by proposing a method and/or an installation and/or a regulation system capable of durably optimizing the supply of energy, in particular thermal energy, in at least one building or the like, while avoiding at least partially the pitfalls, chronic or occasional in nature, some examples of which have been given above.

SUMMARY

According to the invention, the method for supplying energy, in particular thermal energy, in at least one building or the like by means of an installation comprising:
  items of energy collection equipment that relate to energy transfer, each with a respective source;
  items of energy transformation equipment, at least partially fed by the items of energy collection equipment;
  items of equipment that are users of energy;
method in which a regulation is operated placing the items of equipment in respective activation states chosen as a function of the demand and of parameters, in particular climatic parameters, in the sense of optimization with respect to at least one criterion,
is characterized in that at an instant of intervention of the regulation, the regulation comprises the incorporation of forecasts relating to at least one of the parameters, said forecasts concerning a period subsequent to said instant of intervention.

According to the invention, instead of managing the present only as a function of observations and of a situation inherited from the preceding instants, the future situations are anticipated. The activation states defined by the method at a given instant are prepared in order to forecast future difficulties or take advantage of future opportunities that can be anticipated on the basis of accessible items of information. Preferably, the activation states are chosen to achieve an optimization encompassing the future as it can be forecast. For example, if a period of extreme cold is predicted in winter, an exceptionally high energy demand by the occupants can be expected, and at the same time a temporary increase in the prices for energy supplied by the public networks. With the invention this period is anticipated by accumulating energy during the preceding period, in items of storage equipment or resources that can be the geothermal environment, hot water tanks, electric batteries, inertial flywheels, etc. This accumulation is possible for example with at least one thermal solar collector and/or by overconsumption of electricity for actuating at least one heat pump supplying heat to the item of storage equipment or resource. If a period of extreme heat is forecast after a cool period, the heating during the cool period can advantageously be secured by drawing on thermal reserves that will be able to be reconstituted during the period of extreme heat.

In an embodiment, the regulation defines a succession over time of combinations of activation states of at least some of the items of equipment over a duration subsequent to the instant of intervention, in the sense of optimization over the duration with respect to the at least one criterion. At a given instant, the method has already defined in advance not only the activation states of the different items of equipment at this instant, but also the succession of activation states of each item of equipment in the instants that compose a duration subsequent to this instant, and it is this succession that is optimized with respect to the at least one predefined optimization criterion. If in a simple example there is a single optimization criterion that is the cost of operation, the combination of activation states defined by the method for an instant is not necessarily the most economical at this instant, but it will form part of a succession of combinations of states over time that will be the most economical overall at the end of the duration incorporated. The choice of the correct succession of combinations can be carried out by systematically exploring very numerous successions of combinations, in particular those capable of supplying at each given instant, if necessary with a security coefficient, the power that will be necessary at this instant, according to the forecasts incorporated. If there are several optimization criteria, for example reducing the cost of operation and reducing the consumption of energy, it is possible for example to give a fictitious monetary value to the energy consumed and to adopt as criterion the sum of the real financial cost and the fictitious cost of the energy consumed.

The at least one parameter to be incorporated into forecasts can comprise the exterior temperature, and/or sunshine and/or a price for the energy originating from one of the sources, and/or a parameter of the state of one of the sources, for example the temperature of the geothermal environment and/or a parameter of the state of a storage structure. The parameters of climatic or price type are available in coded form for use by the systems.

In a typical version, incorporating forecasts is operated at least partially by an activation state varying the energy content of at least one energy storage structure. For example, in addition to those already presented above, when forecasting a period of extreme heat for which high cooling requirements are expected, it is possible to cool the geothermal environment by virtue of at least one heat pump that heats a storage structure such as a hot water tank that it will then be possible to use for heating sanitary hot water.

In a developed version, the invention makes provision to incorporate the building as a storage structure. A building has a considerable calorific capacity. Furthermore, recent buildings, very well thermally insulated, are capable of storing the thermal energy that they accumulate for a certain period of time. In anticipation of a period of extreme cold, it is possible to overheat the building by a few degrees Celsius, then allow it to cool to a temperature below normal during the period of extreme cold, so as to reduce the need for energy provisioning during the most critical period.

As already stated through preceding examples, in a version of the invention, a geothermal environment equipped with geothermal probes forming part of said items of collection equipment is incorporated as a storage structure. By virtue of the invention, the equipment and the geothermal environment can be managed in a particularly appropriate fashion in the sense of a maximum exploitation of this resource having a low exploitation cost, without risking exhaustion of the resource and consequently of the associated equipment. Thus, the invention also makes it possible to benefit fully from this resource even with a lower investment at the start in terms of probes to install.

According to a preferred version, the at least one storage structure comprises a tank, the energy content of which varies by variation of the proportion of solid phase of a body contained in the tank, for example water or water plus additive.

According to an embodiment, the regulation is capable of modifying the activation states in successive instants of intervention, separated by time-slots where the regulation is passive, the time-slots preferably being of the order of a quarter of an hour.

In an advantageous version, the regulation comprises a main regulation implementing the incorporation of the forecasts, and an automatic control system controlling the items of equipment, in particular as a function of the instantaneous energy demand and of recommendations received from the main regulation. Thus, the method according to the invention is adapted to complement an automatic control system installation, which can, furthermore, be quite conventional. For example, if the installation comprises two heat pumps using different forms or sources of energy, the main regulation according to the invention will for example authorize the operation of one of them and prevent the other, or at other instants prioritize the operation of one with respect to the other. Thus, the activation state according to the invention indicates either a direct command of an item of equipment, or preferably a recommendation for activation or deactivation, or even for example a conditional or restricted recommendation. A conditional recommendation can be for example authorization to operate if another item of equipment, of higher priority, is not able to meet the demand. A restricted recommendation can be for example an authorization with a power limit. The automatic control system can itself comprise a central processing unit that receives the recommendations and controls items of equipment common to the installation as a whole, such as for example an item of geothermal equipment, and subsidiary units operating under the control of the central processing unit and each allocated to a part of the installation, for example a subsidiary unit for each part of an installation allocated to a respective one of the buildings of a building complex. In other words, the central processing unit incorporates a part of the recommendations, relating to the common items of equipment, and transmits to each subsidiary unit the recommendations relating to the items of equipment controlled by this subsidiary unit, respectively.

In a version of the method, incorporating forecasts comprises a forecast of reaction of the geothermal environment to a thermal exchange with geothermal probes forming part of the items of collection equipment. The geothermal environments react quite differently as a function of the nature of the ground, its moisture content, etc.

For the purposes of this incorporation, and particularly in the absence of items of information available in this respect, before commissioning of the installation, it is advantageous to carry out tests of the thermal response of the geothermal environment to thermal exchanges, by means of a test probe.

In a preferred version, the method comprises the following steps:
before commissioning the installation, on the basis of data relating to the building (1), to its expected use, and to its geographical and climatic environment, establishing a time-stamped scenario of the energy flows of the different items of equipment, in the sense of optimization over the period covered by the scenario;
in service, collecting items of information that are more recent than the data, and readjusting the scenario as a function of said items of information;
in service, performing the scenario in its most recent version.

The execution of the scenario can consist of a direct command of the items of equipment or, in a two-level version of regulation, for example such as presented above (main regulation and automatic control system respectively), can consist of the transmission of recommendations to the lower level of regulation. The latter controls the items of equipment as a function of said recommendations and of its own input parameters, such as in particular the level of demand of the different forms of energy.

This version of the invention using a scenario is advantageous because it allows probable events to be incorporated, as far in the future as desired. Specifically, the scenario can concern a whole year, renewable indefinitely in rolling fashion. For example, the scenario can be established for a period running from 1st January to 31st December and on starting the installation the regulation implements the scenario as provided for at the day and time of the start-up, after a period, shorter or longer, required to become fully operational. This period can be long because, for example, a residential building is generally not fully occupied straight away. Once the fully operational state is reached, the scenario is regularly readjusted as a function of the forecasts. In one version, even the ramp up period before becoming fully operational can be optimized by the readjustment process.

The items of information collected typically comprise meteorological forecasts and/or those relating to occupation of the building or the like.

In an advantageous version, readjusting the scenario involves machine learning, based on a time correlation between the past energy needs observed in the building, and parameters, in particular meteorological and calendrical. The scenario is preferably established on the basis of a timing diagram of the estimated energy needs of the building. During use, this timing diagram can be refined or corrected as a function of data that are no longer estimated but real. From this point, the scenario can be corrected in its turn.

Advantageously, the items of information collected comprise a temperature measurement in a geothermal environment equipped with geothermal probes forming part of the items of collection equipment. If these items of information indicate a possibility of drift of the geothermal environment, the scenario is modified in the sense of making the geothermal environment change in the opposite direction to the anticipated drift.

In a particularly preferred version, readjusting the scenario comprises:
    a high-frequency readjustment, typically every quarter of an hour, and readjustment of the scenario over the several days following the instant of readjustment; and
    a low-frequency readjustment, typically every few days, for example every month, readjusting the totality of the scenario.

High-frequency readjustment is preferably as quick as can reasonably be envisaged, in view of the time required to modify the activation states of certain items of equipment, in particular the heat pumps, boilers, etc.

Low-frequency updating corresponds to heavier calculations that for example on the one hand, update the whole scenario on the basis of observations, for example on the energy behaviour of the occupants, or even long-term meteorological forecasts, and on the other hand link this long-term scenario with the version of the scenario as it was updated for the coming days by high-frequency readjustment.

According to a second aspect of the invention, before establishing the scenario discussed above, the following steps are carried out:
    as a function of a dynamic thermal modelling of the building, of an expected use of the building and an annual climatology of the location site of the building, establishing an annual timing diagram of various energy needs of the building;
    acquiring a catalogue of items of equipment for collection transformation, use and/or storage of energy compatible with the timing diagram, and with data relating to the specifications of the building;
    by computerized iterations, virtually testing different combinations of items of equipment from the catalogue and dimensioning of these items of equipment in order to determine those capable of meeting at least the majority of the timing diagram;
    establishing the time-stamped scenario of each of the combinations determined as capable of meeting the timing diagram;
    selecting one of these determined combinations and the corresponding time-stamped scenario, and constructing the installation corresponding to the selected combination.

The installation is then commissioned in accordance with the time-stamped scenario with which it was selected, the scenario then preferably being updated in real time, for example as stated above.

According to a third aspect of the invention, the installation for supplying energy, in particular thermal energy, in at least one building or the like, the installation comprising:
    items of energy collection equipment that relate to energy transfer, each with a respective source;
    items of energy transformation equipment, at least partially fed by the items of collection equipment;
    items of equipment that are users of energy;
    a regulation system capable of defining for at least some of the different items of equipment, respective activation states chosen as a function of parameters, in particular climatic parameters, in the sense of optimization with respect to criteria,
is characterized in that the regulation system implements a method according to the first aspect of the invention, complemented if necessary by one or more of its developments, or a method according to the second aspect.

According to a fourth aspect of the invention, the installation for supplying energy, in particular thermal energy, in at least one building or the like, the installation comprising:
    items of energy collection equipment that relate to energy transfer, each with a respective source;
    items of energy transformation equipment, at least partially fed by the items of collection equipment;
    items of equipment that are users of energy;
    a regulation system capable of defining for at least some of the different items of equipment, respective activation states chosen as a function of parameters, in particular climatic parameters, in the sense of optimization with respect to criteria,
is characterized in that the installation has been configured and operates according to a method in accordance with the second aspect of the invention.

According to a fifth aspect of the invention, the system for regulating an installation intended for supplying energy, in particular thermal energy, in at least one building or the like, this installation comprising:
    items of energy collection equipment that relate to energy transfer, each with a respective source;
    items of energy transformation equipment, at least partially fed by the items of collection equipment;
    items of equipment that are users of energy;
the regulation system being capable of defining for at least some of the different items of equipment, respective activation states chosen as a function of parameters, in particular climatic parameters, in the sense of optimization with respect to criteria, is characterized in that the system is designed to implement in the installation a method according to the first and/or the second aspect of the invention.

Preferably, the regulation system comprises at least one input capable of receiving forecasts concerning a period subsequent to the current instant, the installation being designed to take account of said forecasts as part of the incorporation.

In a preferred version, the regulation system comprises at least one control assembly that prepares recommendations incorporating the forecasts, the recommendations being intended for an automatic control system that receives the recommendations as well as items of information relating to the energy demand, and controls at least some of the items of equipment as a function of the energy demand and of the recommendations.

BRIEF DESCRIPTION OF THE DRAWINGS

Other features and advantages of the invention will become more clearly apparent from the following description, with reference to non-limitative examples. In the attached drawings:

FIG. 1 is a diagram of an installation according to the invention installed in a building, the solid lines representing pipes of liquid and the broken lines representing electrical cables;

FIG. 2 is a set of time diagrams displaying certain aspects of the method according to the invention over one year; and FIG. 3 is a detail view displaying in the form of time diagrams certain aspects of the method according to the invention over part of a day.

DETAILED DESCRIPTION

The following description is understood to describe any feature or combinations of features, in the terms used hereinafter or in more general terms, provided that this feature or combination of features produces a technical effect or advantage, even if the feature or combination of features constitutes only a part of a sentence or of a paragraph.

In the example shown in FIG. 1, the installation is associated with a building 1 sited on a plot 2. The installation comprises items of energy collection equipment here comprising at least one photovoltaic solar panel collector CPh, at least one thermal solar sensor CTh transforming the solar radiation into heat absorbed by a heat transmission liquid passing through it, at least one aerothermal exchanger ATh capable of operating as a heat collector or as a heat dissipator for a heat transmission liquid passing through it exchanging calories with the exterior air, at least one geothermal probe 6 and at least one connection to a public electricity distribution network 7.

An electrical cabinet 8 receives electrical energy from the network 7 and from the photovoltaic collector S and supplies electricity from one and/or the other of these origins on a power outlet 9. In certain embodiments the cabinet can also inject electricity produced by the photovoltaic collector CPh into the public network 7. The installation 2 also comprises a network 3 of pipes for a heat transmission liquid that is generally water or water plus additive, and a network 4 of pipes for sanitary water. The sanitary water network 4 comprises a cold-water connection 11 to a cold-water inlet that directly feeds at least one cold water tap CW and feeds a hot water tap HW via two heating cylinders 12, 13 mounted in series.

Moreover, the installation comprises various items of energy transformation equipment, namely in the example, two reversible heat pumps HP1 and HP2, a heat pump HP3 of cooling type, an electrical resistance 14 transforming into heat, in the cylinder 13, the electricity originating from the cabinet 8, and a resistance 16 doing the same in a cylinder 17 installed at a point of the path of the heat transmission liquid in the network of pipes 3.

Also in the installation, there are items of equipment that are users of energy, namely for example lights 18 and sockets 19 (only one of each is shown), at least one air-conditioning module AC (shown in two places in FIG. 1 for ease of viewing the connections) and a heating module Ht. Here, these modules are exchangers between the heat transmission liquid of the network 3 and the air of the space the temperature of which is to be adjusted. The items of equipment that are users of energy also comprise two heat exchangers 21, 22 between the heat transmission liquid and the sanitary water filling the cylinders 12 and 13 respectively.

The installation also preferably comprises structures for storing thermal energy (hot and/or cold). The storage structures comprise here a tank St of heat transmission liquid, the building 1 itself, and the ground 2 constituting the geothermal environment that interacts with the probe 6. Moreover, a cold tank F is capable of accumulating cold by progressive freezing of a body, for example water or water plus additive, which is contained permanently therein, or to return this cold by progressive thawing of said frozen liquid.

The network of pipes 3 comprises a certain number of three-way valves V1-V23, as well as circulation pumps (not shown).

The installation is capable of various modes of operation. In the embodiment presented, which is in no way limitative, these modes of operation are in particular (the valves mentioned for each mode are in a position to allow the flow indicated and block the third route and the valves not mentioned are closed; except if the third route in question or the valve not mentioned in question is open for another mode indicated as compatible with the mode in question):

Mode 1: Actuation of the heat pump HP1 in production of cold heat transmission liquid for the air-conditioning module AC via the valves V8, V9, V11, V18, air-conditioning unit AC, valves V19, V13, V7, discharging the calories into the geothermal environment via the geothermal probe 6 and the valves V2 and V3.

Mode 1.1: Same thing as Mode 1, except that the calories are discharged into the atmosphere by the aerothermal exchanger ATh via the valves V2, V23, aerothermal exchanger ATh, valves V22, V21, V3.

Mode 2: Actuation of the heat pump HP2 to produce hot heat transmission liquid intended for the tank St via the valve V6, starting from calories supplied to the heat pump HP2 by the thermal solar collector CTh via the valves V15, V5, the pump HP2, the valves V4, V1 and V10.

Mode 2.1: Same thing as Mode 2, except that the heat pump HP2 is supplied with calories by the aerothermal exchanger ATh via the valves V22, V15, V5, heat pump HP2, valves V4, V1, V10 and V23.

Mode 3: Actuation of the heat pump HP2 to produce hot heat transmission liquid intended for the heating module Ht and/or the cylinder 13 via the valves V4, V1, V17, cylinder 17, valve V12, module Ht and/or cylinder 13, valves V14, V16, V5, starting from calories supplied to the heat pump HP2 by the tank St via the valve V6, (the heat pump HP2 thus operating in reverse with respect to Mode 2). Complementary heating possible by the resistance 16 in the cylinder 17.

Mode 4: Circulation of the liquid from the tank St through the valves V8, V9, V11, cylinder 17 (heating possible by the resistance 16), valve V12, module Ht and/or cylinder 13, valve V14 and return to the cylinder St, to supply heat to the heating module Ht and/or to the sanitary hot water cylinder 13.

Mode 5: Actuation of the heat pump HP1 to produce hot heat transmission liquid intended for the heating equipment Ht and/or into the cylinder 13 via the valves V8, V9, V11, V17, cylinder 17 (heating possible by the resistance 16), valve V12, module Ht and/or cylinder 13, valves V14, V13, V7, starting from calories supplied by the thermal solar collector CTh via the valves V15, V5, V4, V3, the pump HP1, the valves V2, V1, V10.

Mode 5.1: Same thing as Mode 5, except that the calories are supplied by the aerothermal exchanger ATh via the valves V22, V15, V5, V4, V3, the pump HP1, the valves V2, V1, V10, V23.

Mode 5.2: Same thing as Mode 5, except that the calories are supplied by the geothermal probe 6 via the valves V2 and V3.

Mode 6: Actuation of the heat pump HP3 to cool the tank F and discharge the calories via the valves V20, V23, the aerothermal exchanger ATh, valves V22, V21.

Mode 6.1: Same thing as Mode 6, but discharging the calories via valve V20, probe 6, valve V21.

Mode 7: Feeding the air-conditioning unit AC starting from the tank F via the valves V18 and V19.

Mode 8: Heating the geothermal environment starting from the thermal solar collector CTh via the valves V15, V5, V4, V3, probe 6, valves V2, V1, V10.

Mode 9: Cooling the geothermal environment by the aerothermal exchanger ATh, via the valves V22, V21, probe 6, valves V20, V23.

When the heat transmission liquid reaches the valve V15, originating from the aerothermal exchanger ATh operating as collector, or originating from the thermal solar collector CTh and in the direction of the inlet valve 5 in the heat pump HP2, according to the position of the valve V15 it can pass into the cylinder 22 in order to heat or preheat the sanitary hot water then through the valve V16 to re-join the valve V5.

Many of the modes described are compatible with one another, there may be mentioned non-limitatively: Modes 1+2+6, Modes 1+3+6, Modes 2+5.1+6+7, Modes 4+6 or 6.1+7+8, Modes 5+6.1+7, Modes 1.1+2 etc. Mode 8 is compatible with most of the Modes not using the thermal solar collector CTh and Mode 9 is compatible with most of the Modes not using the aerothermal exchanger ATh.

An automatic control system 23 controls the items of collection, transformation equipment, the valves and the pumps (not shown) and optionally certain items of equipment that are users of energy so as to respond in real time to the energy demand in its different forms (electricity, sanitary hot water, heating, cooling, storage and taking from storage). The automatic control system 23 and/or automatic and/or manual local commands control the entry into service and stopping of the items of equipment that are users of energy and the automatic control system selectively actuates the other items of equipment in order to optimally meet the demand for the different forms of energy (thermal, cooling, electrical, sanitary).

A control assembly 24 defines the mode or modes of operation to be implemented at an instant of intervention as a function of parameters such as climatic, economic, or relating to the state of the installation, in particular the temperature of the storage structures, in the sense of an optimization with regard to certain criteria for example economic and/or environmental. The automatic control system 23, facing for example a certain demand for power originating from the heating module, implements a recommendation supplied by the control assembly 24 and relating to the optimal means of meeting this demand. As another example, if the photovoltaic solar panel collector CPh supplies electricity, the control assembly recommends the optimal use of this electricity, which can be used for example to feed a heat pump, or to meet a need for heating or sanitary hot water, or for heating the contents of the tank St or the geothermal environment, or for accumulating cold in the tank F. The recommendations delivered by the control assembly can be provided in the form of alternative or cumulative possibilities with priority rankings. Indeed, it is important to avoid the automatic control system 23 being prevented from responding to a demand due to excessively strict recommendations of the control assembly 24. The installation should preferably be operational or even fully operational from the point of view of the occupants of the building even if an item of equipment reaches its power limit or is faulty.

According to the invention the regulation comprises incorporating forecasts relating to at least one of the parameters, said forecasts concerning a period subsequent to said instant of intervention. The parameters for which the forecasts can be incorporated are typically all or part of the following list: exterior temperature, sunshine, wind speed, energy purchase price, energy sale price, environmental parameters, level of occupation of the building, temperature of the storage structures, etc.

The forecasts relating to the climatic, environmental parameters and to the energy prices applicable in the coming period are available in a form capable of directly feeding one or more inputs 31 of the control assembly 24. In practice, the input 31 is typically a connection to a server over the Internet, its representation in FIG. 1 being purely illustrative.

Thus for example, if during a sunny period in the month of May the meteorology predicts an exceptionally cool start to June, the system recommends the use of solar energy for storing heat in the geothermal environment, while storing heat in the tank St starting from the aerothermal exchanger ATh, in order to use these heat stocks during the cool period. Conversely, at this period of the year, in the absence of predicted cooling, the photovoltaic electrical energy will preferably be used to cool the geothermal environment or the tank F for forecast air-conditioning needs.

As another example, in winter a very cold period is predicted, accompanied by an increase in energy prices from the public network: the heat pumps are started with electricity from the public network in order to support the geothermal stock and the heat stock in the tank and even in the building itself by overheating it slightly, for example up to 22° C. before the very cold period. During the very cold period, the stocks will be heavily used, to ensure the needs for heating and sanitary hot water while reducing as far as possible the use of expensive electricity. Bringing the stocks into use can in particular consist of allowing the temperature inside the building to drop, for example from 22° C. to 18° C.

As a third example, a very hot period is predicted, meaning that the air-conditioning using the atmosphere as heat source will not be very efficient. The system recommends the use of at least one heat pump, even at night, to cool the tank F while discharging the calories into the tank St, or if it is at its maximum temperature, into the atmosphere, so as to constitute a cold reserve that will make the air-conditioning more efficient during the period of extreme heat. In such a case it is also possible to use a heat pump to lower the temperature of the geothermal environment, even below its lower safety limit, in the knowledge that the coming significant need for air-conditioning will return the temperature to within the desired range.

A very advantageous option thus consists of actuating a heat pump such as HP3 in the example, to increase the quantity of solid phase in the tank F, and thus increase the cold reserve that will be available during the very hot period. Cooling the geothermal environment, which is less suitable for short-term use due to the very slow temperature change of the geothermal environment, will only be recommended to increase the accumulation power and/or for the case where the content of the tank F is entirely frozen.

Incorporating forecasts is not necessarily limited to climatic or cost considerations. In winter, if a pollution peak is predicted, the system can recommend increased storage in the geothermal environment, the tank St and/or the building itself as thermal storage structure by electric means, even if relatively costly (resistance 16) in order to avoid having to make use of combustion during the pollution peak.

Heretofore, the incorporation of forecasts has been described in relatively short-term examples, with the forecast having an event-driven, more or less exceptional, character, and concerning an imminent period. The invention is not limited thereto. It can also make use of forecasts such as medium-term meteorological forecasts (a few months) and long term forecasts in the form of annual averages for exterior temperature, wind speed (in the knowledge that wind increases heating needs in a heating period), sunshine (on which the power of the photovoltaic collectors and of the solar heat collectors depend, as well as the need for heating and air-conditioning), occupation of the building (on which the energy demand in the building depends) etc. Thus for example, in certain regions February is cold but sunny, which makes it possible to expect a higher photovoltaic production than March, which is often wet.

The short-, medium- and long-term forecasts can be combined. The long-term forecasts are a basis for determining the recommendations valid for each instant. But well before each instant this base is fine-tuned as a function of the medium-term forecasts. In addition, in a preferred embodiment, at least at certain relatively close instants, every quarter of an hour in a particularly preferred embodiment, the recommendations over an imminent short period are corrected as a function of the short-term forecasts. The recommendations transmitted to the automatic control system are those defined according to the long-term forecasts, possibly fine-tuned according to the medium-term forecasts, and possibly corrected according to the short-term forecasts.

In the example shown, the control assembly comprises a local regulator 26 and a central regulator 27 with which the local regulator is linked, for example via the Internet, GPRS, Wi-Fi, wired connection, etc. The central regulator 27 can be common to several buildings and be operated for example by a service provider. The central regulator 27 receives the forecasts either automatically by telecommunications if the forecasts are available in this form, or by manual input if this is not the case.

The central regulator 27 prepares the recommendations such as they result from the short- and medium-term forecasts, and transmits them to the local regulator 26. Moreover, certain forecasts are transmitted from the central regulator 27 to the local regulator 26, in particular the short-term forecasts. The local regulator 26 also receives items of local information, for example the temperature $T_G$ measured by a probe close to the probes 6, or even the temperature of the heat transmission liquid in the tanks St or the proportion of solid phase in the tank F, by probes (not shown). The local regulator 26 corrects the recommendations received as required, as a function of the short-term forecasts, and transmits the recommendations to the automatic control system 23, thus corrected if appropriate.

The local regulator 26 carries out monitoring at a relatively high frequency, for example every quarter of an hour, of the relevance of the recommendations with respect to the current measurements and the short-term forecasts. The readjustment thus carried out concerns only the recommendations relating to the imminent period, for example the fortnight following the current instant. This relatively high monitoring frequency and readjustment if appropriate is advantageous as the recommendations vary quite significantly from one moment to another of a single day. The calculation power required for these high-frequency readjustments over a limited period is less than that required by medium- and long-term readjustments.

The central regulator 27 carries out the medium- and long-term readjustments. It receives from the local regulator 26 items of information that relate in particular to the short-term readjustments. In particular, the short-term readjustments can diverge from the medium- and long-term recommendations. The central regulator 27 establishes a continuity solution between the set of medium-term recommendations and the readjusted short-term forecasts.

In a preferred embodiment of the invention, a scenario is established before commissioning based on long-term forecasts, themselves based on climatic normals for the place where the building is sited, data relating to its location site in particular in terms of sunshine, exposure to wind, items of equipment of the building in terms of heating, air-conditioning, hot water production, establishment of thermal reserves, electricity consumption, etc., the expected use of the building. This scenario sets out for each instant of intervention (for example an instant of intervention every quarter of an hour) of the entire year to come, the set of recommendations relating to this instant. The recommendations relating to each of the instants of intervention subject to the scenario aim for optimization of the operation of the installation, not only at the instant in question, but also incorporating the short-, medium- and long-term future with respect to the instant in question.

At the time of design of a building, or for the purpose of renovation of the energy installation of an existing building, it is usual in France and in some other countries to establish "dynamic thermal modelling" (DTM) that constitutes a long-term forecast (typically over an entire year) of the thermal needs of the building, in terms of heating, air-conditioning, sanitary hot water, etc. as a function of parameters such as the climatology of the place, the exact location site, more or less exposed to sun or wind etc. In a preferred embodiment of the invention, this DTM (or equivalent in other countries) is one of the elements for establishing the scenario. Other elements are the expected use of the building. For example, it is known that an office building is less occupied at the weekend, and will use less sanitary hot water even during the week, a hotel in a tourist area will have a particularly high occupancy level at certain periods of the year, etc. Some types of building can have a simultaneous need for heating in certain areas and cooling for other areas, etc.

On commissioning of the building equipped with its installation, the control assembly 24 applies the scenario starting with the exact instant (date and time) of the year corresponding to the commissioning, then the scenario is perpetuated for a rolling year starting from the current instant.

At the same time, as a function of the short-term forecasts, the scenario is readjusted for the short period to come, for example for the following fortnight.

Thus readjusted for the short term, the scenario for the immediate future (for example the fortnight following the current instant) does not necessarily tie in with the annual scenario in force at this instant. The readjusted short-term scenario, as well as the medium-term forecasts, are incorporated for the medium-term readjustment, which will end by meeting the annual scenario. The medium-term readjustment is carried out at a much lower frequency, for example every few days, typically every month, than the short-term readjustment.

The long-term scenario, for example for a rolling year, can vary if certain "permanent" parameters change. For example climatic normals can change, the exposure of the building to sun or wind can change, as can its use or even its items of equipment (for example the construction of a swimming pool), or even the routines of the occupants (conversion of a residential building into an office building or vice versa for example). Incorporating this type of change in the annual scenario can be done in different ways. In certain cases the installation of new items of equipment affects the list of commands capable of being the subject of recommendations, for example a swimming pool can at the same time constitute a thermal reserve and a new energy optimization variable. In other cases, for example change in the climatic normals, automatic input is possible. Independently of the first cases mentioned, it is preferable according to the invention for the control assembly to comprise a machine learning function. For example, the real change in the needs of the building as a function of the day of the week or the period of the year can be compared to the prediction of the annual scenario and if need be, corrected, in particular in the case of persistent divergence between the annual scenario and the observed reality. Finally, it can also be envisaged to modify the scenario "manually", in other words by a human initiative. For example, a new DTM can be established, and starting from this, a new annual scenario.

FIG. 2 shows partially what has just been described. The annual scenario is shown with dashed lines, the observable reality up to an instant D is shown with a solid line. The readjusted short-term scenario (closely spaced dots) extends up to D+15 (D+15 days), and the readjusted medium-term scenario (wider spaced dots) up to D+90 (D+90 days). For obvious reasons it is not possible to show the annual scenario in quarters of an hour. The following have been chosen to show in order from top to bottom of the figure:

Exterior temperature T MAXI and T MINI for each day according to the annual scenario.

Temperature T MAXI observed up to D, then forecast up to D+15.

Wind speed W according to the annual scenario, as well as that observed up to D and forecast up to D+15 according to the short-term forecasts.

Sunshine S according to the annual scenario, as well as that observed up to D and forecast up to D+15 according to the short-term forecasts.

Electrical power P required in the installation according to the annual scenario, as well as that observed up to D and forecast up to D+15 according to the short-term forecasts.

Electrical power $P_{NW}$ supplied by the public network according to the annual scenario, as well as that observed up to D and forecast up to D+15 according to the short-term forecasts.

Electricity price €/kW observed up to D and forecast up to D+90.

Temperature $T_{St}$ in the tank St according to the annual scenario, as well as that observed up to D and forecast up to D+90 according to the short- and medium-term forecasts.

Temperature $T_B$ of the building according to the annual scenario, as well as that observed up to D and forecast up to D+90 according to the short- and medium-term forecasts.

Temperature $T_G$ in the geothermal environment 2 according to the annual scenario, as well as that observed up to D and forecast up to D+90 according to the short- and medium-term forecasts.

In the example thus shown, a very cold period occurred at the start of the year. The electricity price €/kW was increased. The system was successful in reducing the power consumption from the public network ($P_{NW}$). To this end, the temperature $T_B$ of the building and $T_{St}$ of the tank were raised in advance, then these temperatures dropped significantly during the very cold period so that the corresponding calories were used to compensate for the thermal losses of the building.

The diagrams in FIG. 2 relate more particularly to a current instant D towards the middle of the summer. The summer was relatively cool, so that the air-conditioning needs, and the needs for power P in general, were less than those forecast by the annual scenario. A particularly cool and windy period is forecast for the next few days, up to D+15. The tank St and the building will not be able to be heated as much as anticipated in the forecast by the annual scenario for the autumn. The corrected short-term scenario diverges from the scenario in force. The readjusted medium-term scenario up to D+90 organises a meeting point with the annual scenario at D+90. To avoid overloading all the diagrams, with respect to the power P, only the preceding readjusted medium-term scenario has been shown, with a dash-dotted line, up to D+75 where it met the annual scenario which was previously followed by the installation up to date D when cold was predicted.

FIG. 3 shows, for several parameters, their development over part of a day, from 15.00 to 23.00 (3 μm to 11 μm). The exterior temperature $T_{EXT}$ drops from 25° C. to 18° C., the power $P_S$ supplied by the photovoltaic solar panel collector CPh ceases towards 19.30, the power $P_{NW}$ supplied by the network experiences a peak at the end of the afternoon when the air-conditioners are still operating and the specific needs of this part of the day (showers, food preparation, lighting etc.) appear but can no longer be provided for by solar energy. In this particular case the power exchanged with the public distribution network $P_{NW}$ is negative at the start of the period since the photovoltaic collector CPh injects current into the public network. At the same time, the temperature $T_{St}$ of the tank increases starting from heat originating from the aerothermal collector. The temperature of the geothermal environment increases, as a result of the thermal discharges due to the air-conditioning. The diagrams in FIG. 3 show by way of example to what extent the relevant recommendations vary from one moment of the day to another, hence the benefit of a scenario that is very finely divided in time, for example by quarters of an hour.

According to another aspect of the invention, a new method for the design of an energy installation in a building is proposed. In the knowledge of the specifications of the building or more generally the constraints applicable to the design of this installation, the method comprises the following steps:

As a function of the dynamic thermal modelling of the building, of an expected use of the building and an annual climatology of the location site of the building, an annual timing diagram is established of the various energy needs of the building.

A catalogue is acquired of items of equipment for collection, transformation, storage and use of energy compatible with the timing diagram, and with data relating to the specifications of the building. For example, local technical possibilities are incorporated, for example whether or not it is possible to install geothermal systems, over what surface area, depth, nature of the ground. Budgetary constraints for example are incorporated for investment, operation or a combination of the two, in the knowledge that in many projects a higher investment is acceptable if this makes it possible to reduce the operating cost, whether or not it is possible to install one or more tanks such as St or F in FIG. 1.

Computerized iterations virtually testing different combinations of items of equipment from the catalogue, each in different dimensionings of certain of their parameters, in order to determine those capable of meeting at least the majority of the timing diagram. The iterations can start from a combination of items of equipment, each in intermediate dimensionings, relating to items of equipment that are a priori the most favourable with respect to budgetary and/or ecological considerations, such as geothermal systems, solar thermal systems, photovoltaic systems, heat pumps, aerothermal exchanger, thermal reserves, then inserting other types of items of equipment to ensure additional needs, and from that point reducing the share of the first and increasing the share of the second until the needs are met. In total, thousands of combinations can be explored in the manner of a matrix with n dimensions. For one and the same type of equipment, for example geothermal probes, the different dimensionings explored can concern several dimensioning parameters, for example number of probes, depth of installation, spacing, etc.

To assess the suitability of each possible combination to meet the needs, a time-stamped scenario is established and if necessary, detection of its inability to cover the needs with a sufficient safety margin at one period of the year or another, or conversely an excess of performance making it possible to envisage a more economical solution that would be sufficient.

Then one of these determined combinations and the corresponding time-stamped scenario is selected, the installation corresponding to the selected combination is constructed, and the installation is commissioned according to said time-stamped scenario.

Of course, the invention is not limited to the examples described and shown. The installation shown in FIG. 1 is only one example among an infinite number of others possible, and is moreover only a very schematic visualization of a real installation which would comprise many more than one item of equipment of each kind, many more than one single geothermal probe, for example up to over 100 probes, and often relating to more than one building, etc.

The invention can be applied to building complexes of very diverse kinds. In certain cases, there is a need simultaneously for heat (for housing, offices, etc.) and cold (for example for a refrigerated warehouse), as is allowed by some of the Modes 1 to 7 described above. In other cases, there is only a need for heat (cold countries), or almost entirely for cold (hot countries). The invention is compatible with all these specific cases.

In a fashion not shown, the items of equipment can comprise additional boilers, for example gas boilers, used for example to heat a cylinder such as 17 or a cylinder of sanitary hot water such as 12 or 13, or contribute to the heating of such a cylinder.

The invention claimed is:

1. A method for supplying energy, in particular thermal energy, in at least one building by means of an installation comprising:
   items of energy collection and transfer equipment, each with a respective source;
   items of energy transformation equipment, at least partially fed by the items of collection equipment; and
   items of equipment that are users of energy;
wherein the method including a regulation is operated placing the items of equipment in respective activation states chosen as a function of the demand and of parameters; and
wherein at an instant of intervention of the regulation, the regulation comprises incorporating forecasts relating to at least one of the parameters, said forecasts concerning a period subsequent to said instant of intervention,
wherein the at least one parameter to be incorporated into forecasts comprises a parameter of the state of a storage structure,
wherein the method comprises the following steps:
   before commissioning the installation, on the basis of data, to expected building use, and to geographical and climatic environment of the building, establishing a time-stamped scenario of the energy flows of the different items of equipment;
   in service, collecting items of information, and readjusting the scenario as a function of said items of information,
the items of information collected comprising meteorological forecasts,
the readjustment of the scenario involving machine learning, based on processing establishing a time correlation between past energy needs observed in the building, and meteorological and calendrical parameters; and
   in service, performing the scenario in its most recent version;
wherein the activation states defined by the method at a given instant are chosen to achieve an optimization on the basis of accessible items of information.

2. The method according to claim 1, characterized in that the regulation defines a succession over time of combinations of activation states of at least some of the items of equipment over a duration subsequent to the instant of intervention.

3. The method according to claim 1, characterized in that the at least one parameter to be incorporated into forecasts comprises at least one climatic parameter from exterior temperature, sunshine, wind speed.

4. The method according to claim 1, characterized in that the at least one parameter to be incorporated into forecasts comprises an energy price originating from one of the sources.

5. The method according to claim 1, characterized in that the at least one parameter to be incorporated into forecasts comprises a parameter of the state of one of the sources.

6. The method according to claim 1, characterized in that incorporating forecasts is operated at least partially by an activation state varying the energy content of at least one energy storage structure.

7. The method according to claim 1, characterized in that the building is incorporated as the storage structure.

8. The method according to claim 1, characterized in that a geothermal environment equipped with geothermal probes forming part of said items of collection equipment is incorporated as the storage structure.

9. The method according to claim 1, characterized in that the at least one storage structure comprises a tank, the energy content of which varies by variation of the proportion of solid phase of a body contained in the tank.

10. The method according to claim 1, characterized in that the regulation incorporates the forecasts in successive instants of intervention, separated by time-slots, the time-slots being of the order of a quarter of an hour.

11. The method according to claim 1, characterized in that the regulation comprises a main regulation implementing the incorporation of the forecasts in order to prepare the recommendations, and an automatic control system controlling the items of equipment as a function of the instantaneous energy demand and the recommendations received from the main regulation.

12. The method according to claim 1, characterized in that incorporating forecasts comprises a forecast of reaction of the geothermal environment to a thermal exchange with geothermal probes forming part of the items of collection equipment.

13. The method according to claim 12, characterized in that before the commissioning of the installation, tests of the thermal response of the geothermal environment to thermal exchanges are carried out by means of a test probe.

14. The method according to claim 1, characterized in that the items of information collected comprise a temperature measurement in a geothermal environment equipped with geothermal probes forming part of the items of collection equipment.

15. The method according to claim 1, characterized in that the readjustment of the scenario comprises:
a high-frequency readjustment, every quarter of an hour, and readjustment of the scenario over the several days following the instant of readjustment; and
a low-frequency readjustment, every few days, readjusting the totality of the scenario.

16. The method according to claim 1, characterized in that before establishing the scenario, the following steps are performed:
as a function of a dynamic thermal modelling of the building, of an expected use of the building and an annual climatology of the location site of the building, establishing an annual timing diagram of the various energy needs of the building;
acquiring a catalogue of items of equipment for collection, transformation, use and/or storage of energy compatible with the timing diagram, and with data relating to the specifications of the building;
by computerized iterations, virtually testing different combinations of items of equipment from the catalogue and dimensioning of these items of equipment in order to determine the combinations capable of meeting at least the majority of the timing diagram;
establishing the time-stamped scenario of each of the combinations determined as capable of meeting the timing diagram; and
selecting one of these determined combinations and the corresponding time-stamped scenario, constructing the installation corresponding to the selected combination.

17. An installation for supplying energy, in at least one building, the installation comprising:
items of energy collection and transfer equipment, each with a respective source, said source comprising at least one storage structure;
items of energy transformation equipment, at least partially fed by the items of collection equipment;
items of equipment that are users of energy;
a regulation system-configured for defining for at least some of the different items of equipment, respective activation states chosen as a function of climatic parameters, in the sense of optimization with respect to criteria; and
the regulation system implements the method according to claim 1.

18. An installation for supplying thermal energy, in at least one building, the installation comprising:
items of energy collection and transfer equipment, each with a respective source, said source comprising at least one storage structure;
items of energy transformation equipment, at least partially fed by the items of collection equipment;
items of equipment that are users of energy;
a regulation system configured for defining for at least some of the different items of equipment, respective activation states chosen as a function of climatic parameters; and
the installation has been configured and operates in accordance with the method according to claim 16.

19. A system for regulating an installation intended for supplying thermal energy, in at least one building, the installation comprising:
items of energy collection and transfer equipment, each with a respective source, said source comprising at least one storage structure;
items of energy transformation equipment, at least partially fed by the items of collection equipment;
items of equipment that are users of energy;
the regulation system being configured for defining for at least some of the different items of equipment, respective activation states chosen as a function of climatic parameters; and
the system is designed to implement in the installation the method according to claim 1.

20. The installation according to claim 17, characterized in that the regulation system comprises at least one input capable of receiving forecasts concerning a period subsequent to the current instant, the installation being designed to take account of said forecasts as part of the incorporation.

21. The installation according to claim 17, characterized in that the regulation system comprises at least one control assembly that prepares recommendations incorporating the forecasts, the recommendations being intended for an automatic control system that receives the recommendations as well as items of energy demand information, and controls at least some of the items of equipment as a function of the energy demand and of the recommendations.

* * * * *